(12) United States Patent
Subacchi

(10) Patent No.: US 9,605,777 B2
(45) Date of Patent: Mar. 28, 2017

(54) LINER FOR CONCRETE ARTICLE

(71) Applicant: Hawkeye Concrete Products Co., Mediapolis, IA (US)

(72) Inventor: Claudio Subacchi, Mediapolis, IA (US)

(73) Assignee: HawkeyePedershaab Concrete Technologies, Inc., Clayton, MO (US)

( * ) Notice: Subject to any disclaimer, the term of this patent is extended or adjusted under 35 U.S.C. 154(b) by 74 days.

(21) Appl. No.: 14/709,599

(22) Filed: May 12, 2015

(65) Prior Publication Data

US 2015/0330535 A1   Nov. 19, 2015

Related U.S. Application Data

(60) Provisional application No. 61/992,275, filed on May 13, 2014.

(51) Int. Cl.

| | |
|---|---|
| *F16L 9/00* | (2006.01) |
| *F16L 9/08* | (2006.01) |
| *F16L 11/118* | (2006.01) |
| *F16L 9/14* | (2006.01) |
| *B28B 19/00* | (2006.01) |
| *B28B 21/56* | (2006.01) |

(Continued)

(52) U.S. Cl.
CPC .............. *F16L 9/08* (2013.01); *B28B 19/0038* (2013.01); *B28B 19/0046* (2013.01); *B28B 21/56* (2013.01); *B28B 21/58* (2013.01); *B29C 53/78* (2013.01); *F16L 9/085* (2013.01); *F16L 9/14* (2013.01); *F16L 9/153* (2013.01); *F16L 11/118* (2013.01)

(58) Field of Classification Search
CPC ........ B29C 63/32; F16L 55/1655; F16L 11/16

USPC ........... 138/98, 97, 154, 129, 122, 109, 175; 428/192; 405/150.1, 184.2

See application file for complete search history.

(56) References Cited

U.S. PATENT DOCUMENTS 3,273,600 A * 9/1966 Swan ...................... F16L 11/16
                                                  138/122
4,121,624 A * 10/1978 Chen ...................... F16L 11/16
                                                  138/122

(Continued)

FOREIGN PATENT DOCUMENTS

| AU | WO 2013020169 A1 * | 2/2013 | ............. B29C 53/78 |
|---|---|---|---|
| DE | 4102283 C1 | 7/1992 | |

(Continued)

OTHER PUBLICATIONS

International Search Report and Written Opinion dated Sep. 7, 2015 for related PCT Application No. PCT/US2015/030272.

*Primary Examiner* — Patrick F Brinson
(74) *Attorney, Agent, or Firm* — Shuttleworth & Ingersoll, PLC; Jason Sytsma

(57) ABSTRACT

The liner includes a rib formation with a transverse section configured to mechanically lock the liner to a concrete shell and a joint to allow the rib formation to flex. The joint for the rib formation can comprise a first side spaced apart from a second side with each joined to the transverse section to allow each side to flex with respect to each other. The space between the first side and the second side can be filled with a weld material to add rigidity to the rib formation while allowing it to flex. Each of the first side and the second side can be combined at the other end to a shell. The combined rib formation and shell are spirally wound to create the liner.

15 Claims, 13 Drawing Sheets

(51) Int. Cl.
  *B28B 21/58* (2006.01)
  *B29C 53/78* (2006.01)
  *F16L 9/153* (2006.01)

(56) References Cited

U.S. PATENT DOCUMENTS

| | | | |
|---|---|---|---|
| 4,375,381 A * | 3/1983 | Carlson | F16L 11/16 156/195 |
| 4,490,200 A * | 12/1984 | Dillon | F16L 11/16 156/143 |
| 4,589,448 A * | 5/1986 | del Valle | F16L 11/16 138/122 |
| 4,687,690 A * | 8/1987 | Menzel | B21C 37/121 138/122 |
| 4,771,530 A | 9/1988 | Creedom | |
| 4,860,797 A | 8/1989 | Richards et al. | |
| 4,864,711 A * | 9/1989 | Yokota | B29C 57/005 29/421.1 |
| 5,388,929 A * | 2/1995 | Molyneux | E03F 3/06 405/146 |
| 5,660,912 A * | 8/1997 | Menzel | F16L 1/00 138/122 |
| 2010/0180973 A1* | 7/2010 | Ohira | B29C 53/78 138/98 |
| 2012/0152396 A1 | 6/2012 | Friedrich et al. | |
| 2012/0156414 A1* | 6/2012 | Stukerjurgen | B29C 53/78 428/36.91 |
| 2014/0190585 A1* | 7/2014 | Weaver | B29C 53/78 138/98 |

FOREIGN PATENT DOCUMENTS

| | | | | |
|---|---|---|---|---|
| DE | EP 0556533 A1 * | 8/1993 | | F16L 58/185 |
| JP | 0518478 A * | 1/1993 | | B29C 63/30 |
| JP | 2002144426 A * | 5/2002 | | |
| WO | WO03062697 A1 | 7/2003 | | |

* cited by examiner

LINER FOR CONCRETE ARTICLE

This application claims priority to U.S. Provisional Application No. 61/992,275 filed May 13, 2014, the entirety of which is hereby incorporated by reference herein.

FIELD OF INVENTION

This disclosure is directed to a liner for a concrete pipe, and more specifically, to a liner with interspaced joints to allow the liner to expand and contract without damaging the liner.

BACKGROUND

Pipes used for the conveyance of domestic sewage and industrial waste, except those of small diameter, are usually formed of concrete as this is the only economical material available. The use of concrete pipe presents serious difficulties in the transporting of sewage and wastes because the concrete is sometimes attacked by the action of the liquids and gases present in the material conveyed. Sewage gases have been found particularly destructive of the concrete in many localities and in view of this various attempts have been made to provide a lining for the pipe which will not be attacked by the material carried or the gases given off therefrom.

Linings have been applied both as a continuous coating and in the form of a multiplicity of liner plates. The various surface coatings which have been tried present difficulties in the securing of a tight bond to the wall of the pipe and in the securing of an impervious and abrasion-resistant surface. The results of these difficulties are that the surface failed to prevent the infiltration of destructive liquids and gases to the concrete, and the defective bond at times permitted scaling off and cracking of the lining.

In view of the difficulties and disadvantages of the various types of linings for concrete pipes, a new and improved concrete pipe with liner is desirable.

SUMMARY

Disclosed is a liner for a concrete article. The liner includes a rib formation with a transverse section configured to mechanically lock the liner to a concrete shell and a joint to allow the rib formation to flex. The joint for the rib formation can comprise a first side spaced apart from a second side with each joined to the transverse section to allow each side to flex with respect to each other. The space between the first side and the second side can be filled with a weld material to add rigidity to the rib formation while allowing it to flex. Also, the end of the first side opposite from the transverse section can comprise a female end, and the second side can have a cooperating male end that fit together to create a labyrinth seal to prevent contents from inside the liner from contacting the concrete shell. Each of the first side and the second side can be combined at the other end to a shell. The combined rib formation and shell are spirally wound to create the liner.

Each end of the liner is combined to one of a male end cap and a female end cap. The combined liner is used as a mold with a concrete shell cast there around. The liner and end caps cooperate to form a transport area that completely shields the concrete shell from the contents and gasses in the transport area. The liner can expand and contract with temperature and pressure variations inside the transport area.

BRIEF DESCRIPTION OF THE DRAWINGS

The above and other objects, features, and advantages will become more readily apparent from the following, it being understood that any feature described with reference to one implementation of the invention can be used where possible with any other implementation and that reference numerals or letters not specifically mentioned with reference to one figure but identical to those of another refer to structure that is functionally if not structurally identical. In the accompanying drawing.

DETAILED DESCRIPTION

Figure 1:
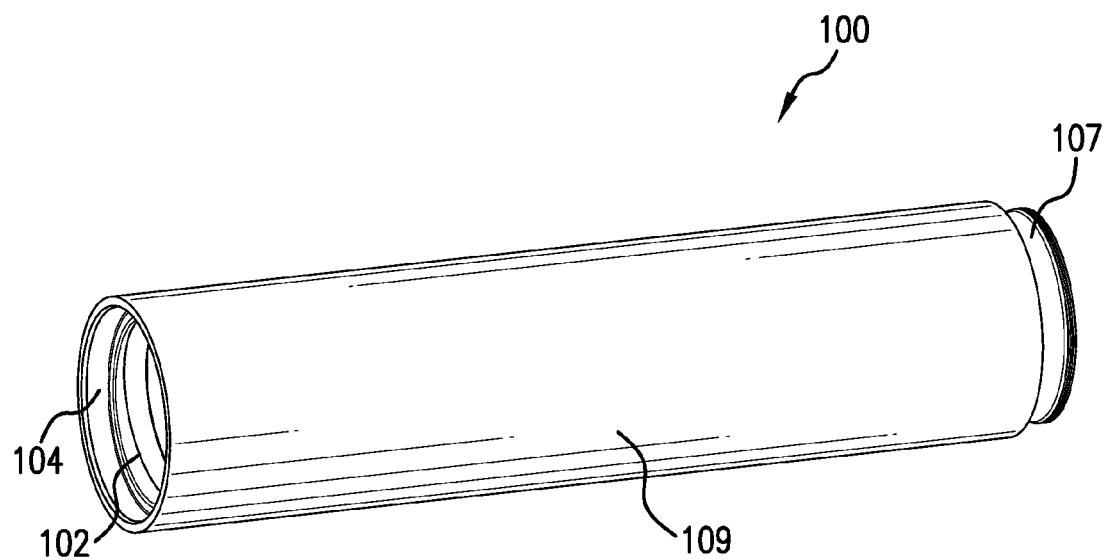
FIG. 1 shows a concrete pipe with internal liner according to an implementation of this disclosure.
Figure 2:
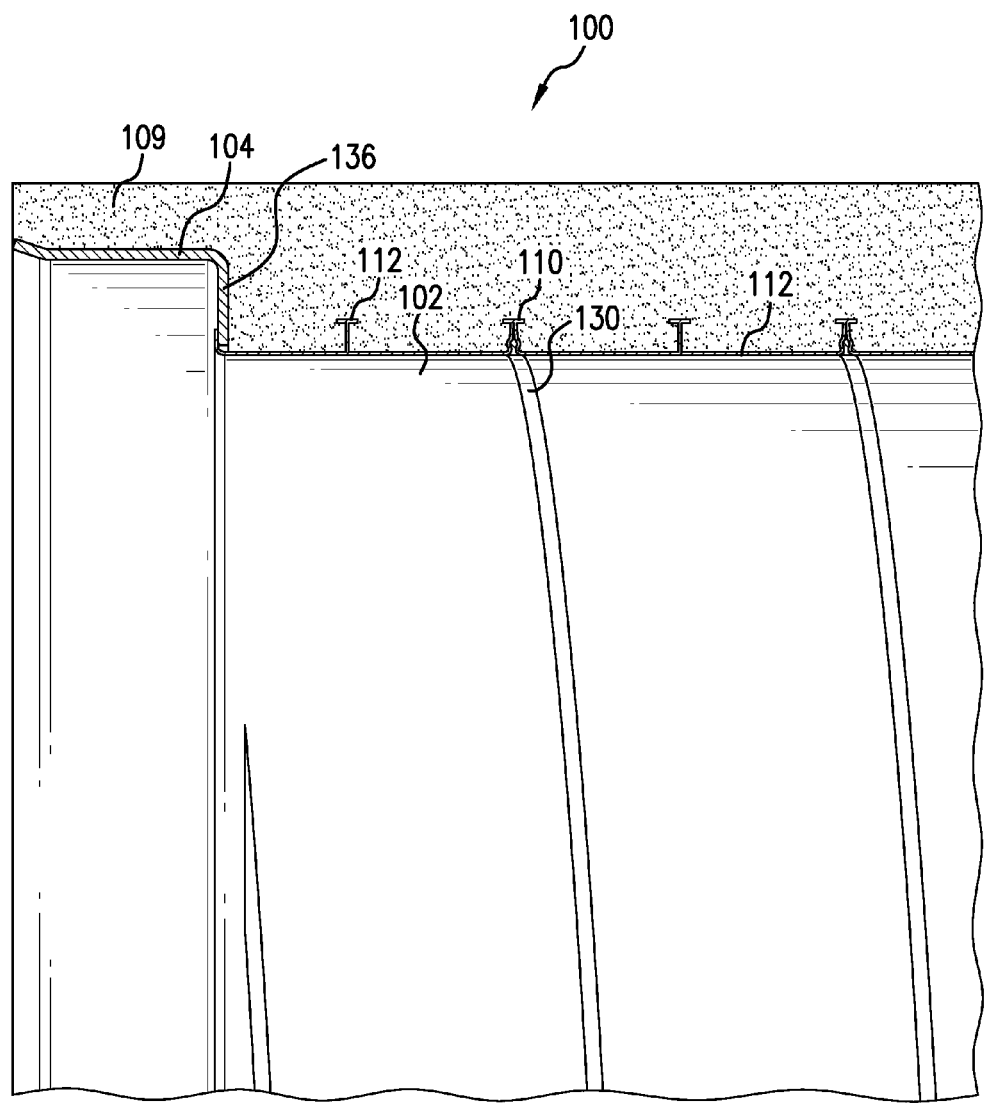
FIG. 2 shows a side sectional view of the pipe of FIG. 1.

FIG. 1 shows a lined concrete pipe 100 in accordance with one implementation of this disclosure. Lined concrete pipe 100 generally includes a liner 102 (shown independently in FIGS. 3-4), a female end cap 104, a male end cap 107, and a concrete shell 109. The foregoing structure utilizes both plastic and concrete to obtain the best structural aspects of each material. The design offers better structural performance, reduced weight over existing concrete pipes, corrosion protection, and elimination of leakage from external hydrostatic forces.

Figure 3:
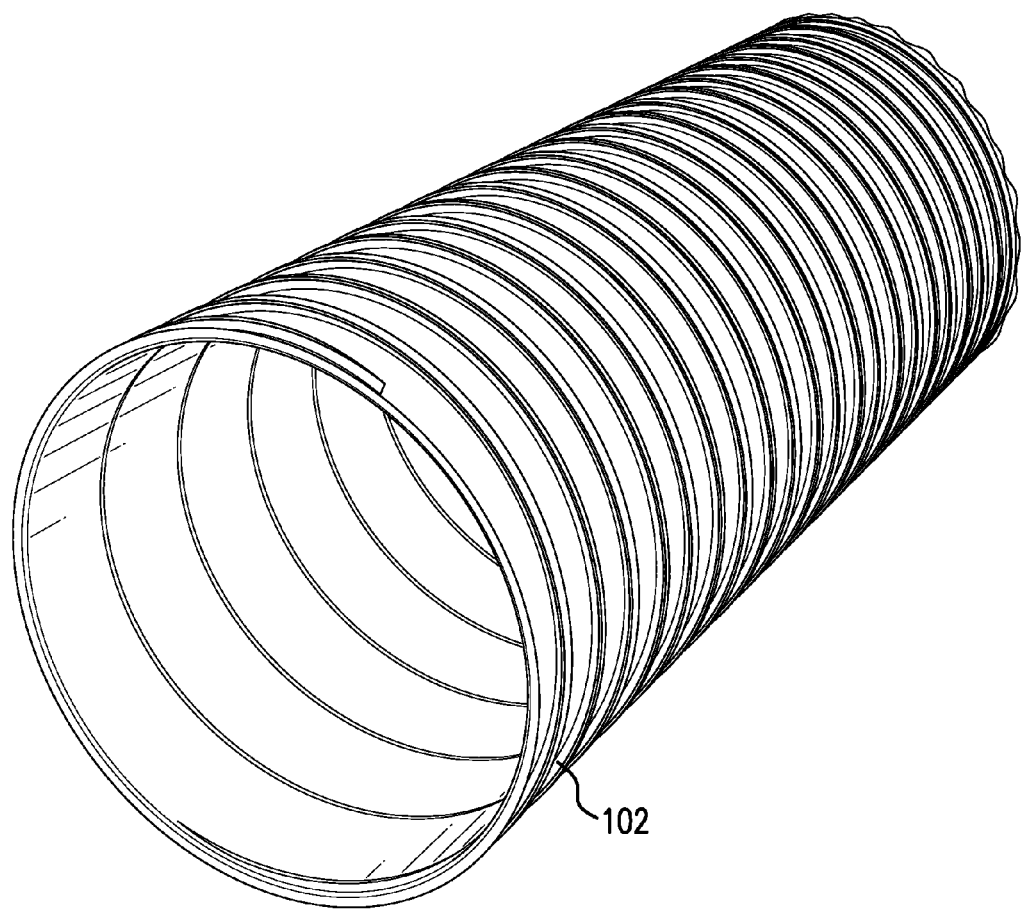
FIG. 3 shows a perspective view of a liner for the concrete pipe.
Figure 4:
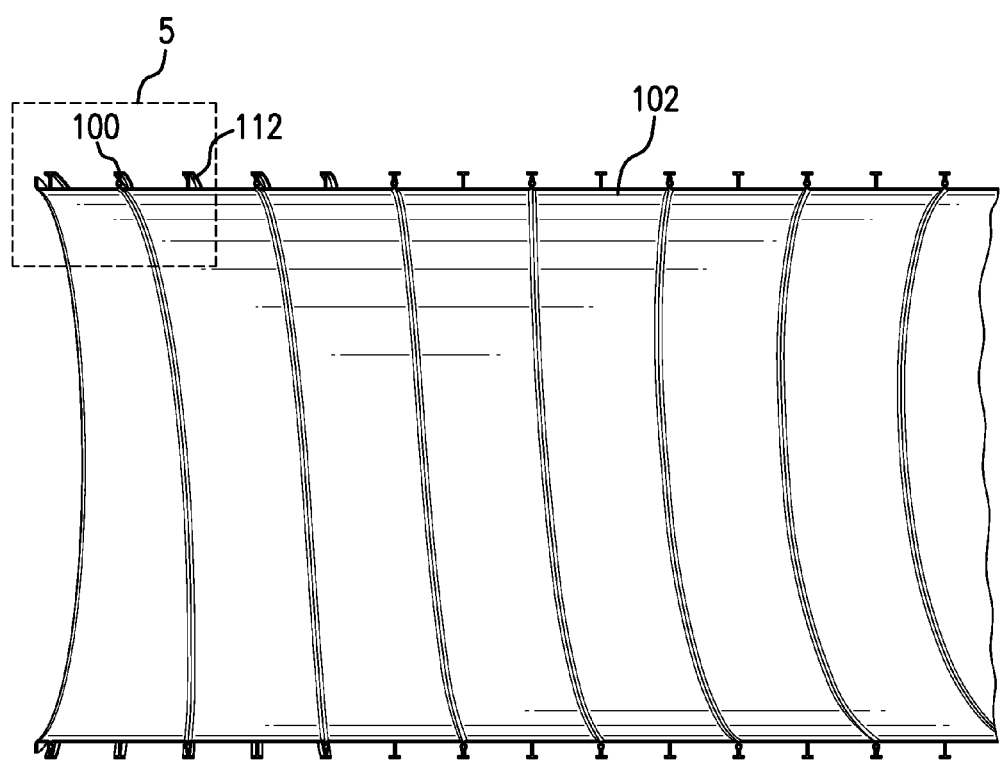
FIG. 4 shows a side sectional view of the liner of FIG. 3.
Figure 5:
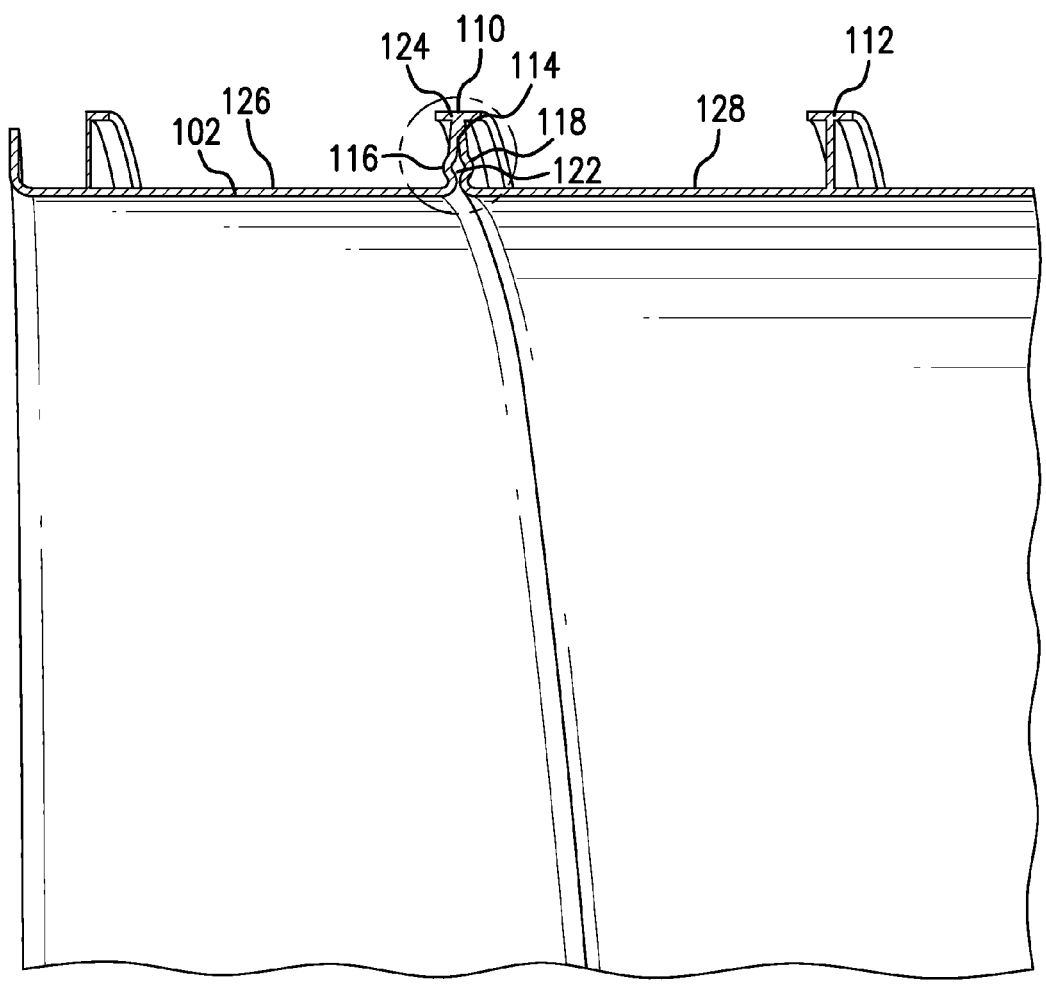
FIG. 5 shows a close-up view of area 5 of FIG. 4.
Figure 5A:
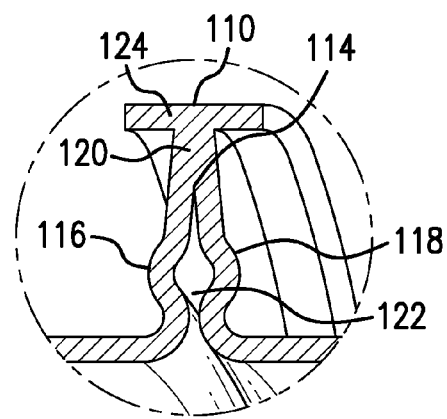
FIG. 5A shows a close-up view of the circled area in FIG. 5.
Figure 6:
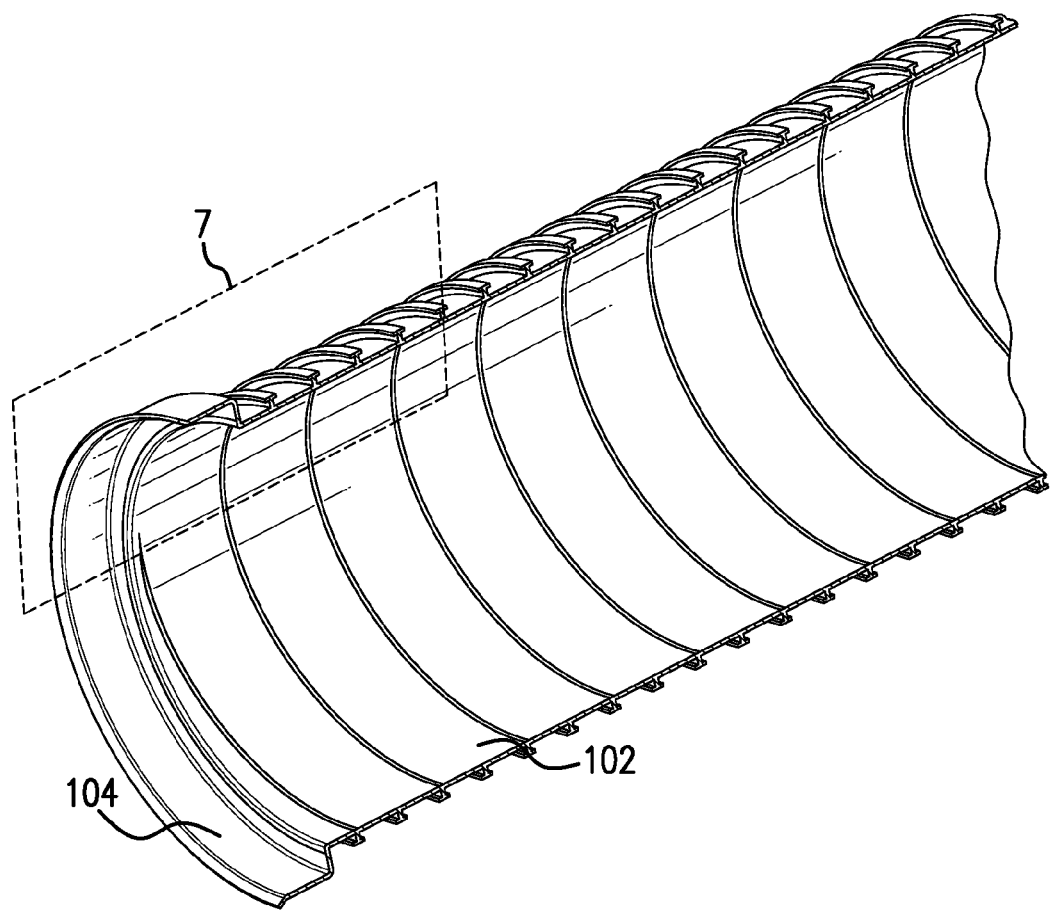
FIG. 6 shows a perspective sectional view of the liner of FIG. 3 combined with a female end cap.

FIGS. 3-5 show liner 102 in accordance with one implementation of this disclosure. Liner 102 has two types of alternating rib formations to mechanically lock liner 102 to concrete shell 109, a rib formation 110 with a joint 114 and a rigid rib formation 112 without joint 114. One skilled in the art would recognize that rib formation 112 can be replaced with rib formation 110 without departing from this disclosure. The benefit of the illustrated embodiment is that liner 102 has a suitable amount of expansion provided by alternating rib formation 110 with rib formation 112 with less cost and work for the reasons discussed below.

FIG. 5 shows rib formation 110, which includes joint 114, has a first side 116 and a second side 118 joined together at the top by joint 114. In practice, joint 114 can be formed by a split up the center of rib formation 110 with the terminus of the split being the point of flexion; however, any mechanism to combine first side 116 with second side 118 is contemplated. A space 122 is formed between first side 116 and second side 118, which provides space for first side 116 and second side 118 to move with respect to each other as liner 102 expands and contracts.

Rib formation 110 has a transverse section 124 that extends generally perpendicular to first side 116 and second side 118. Transverse section 124 mechanically locks liner 102 to concrete shell 109.

First side 116 and second side 118 of rib formation 110 can each be combined with a first shell 126 and a second shell 128, respectively, of liner 102 and can be integral with each. Rib formation 110 and both or one of first shell 126 and second shell 128 can be spirally wound and welded together to form liner 102. In another implementation, rigid rib formation 112 can be combined to one of or both of first shell 126 and second shell 128.

Figure 7:
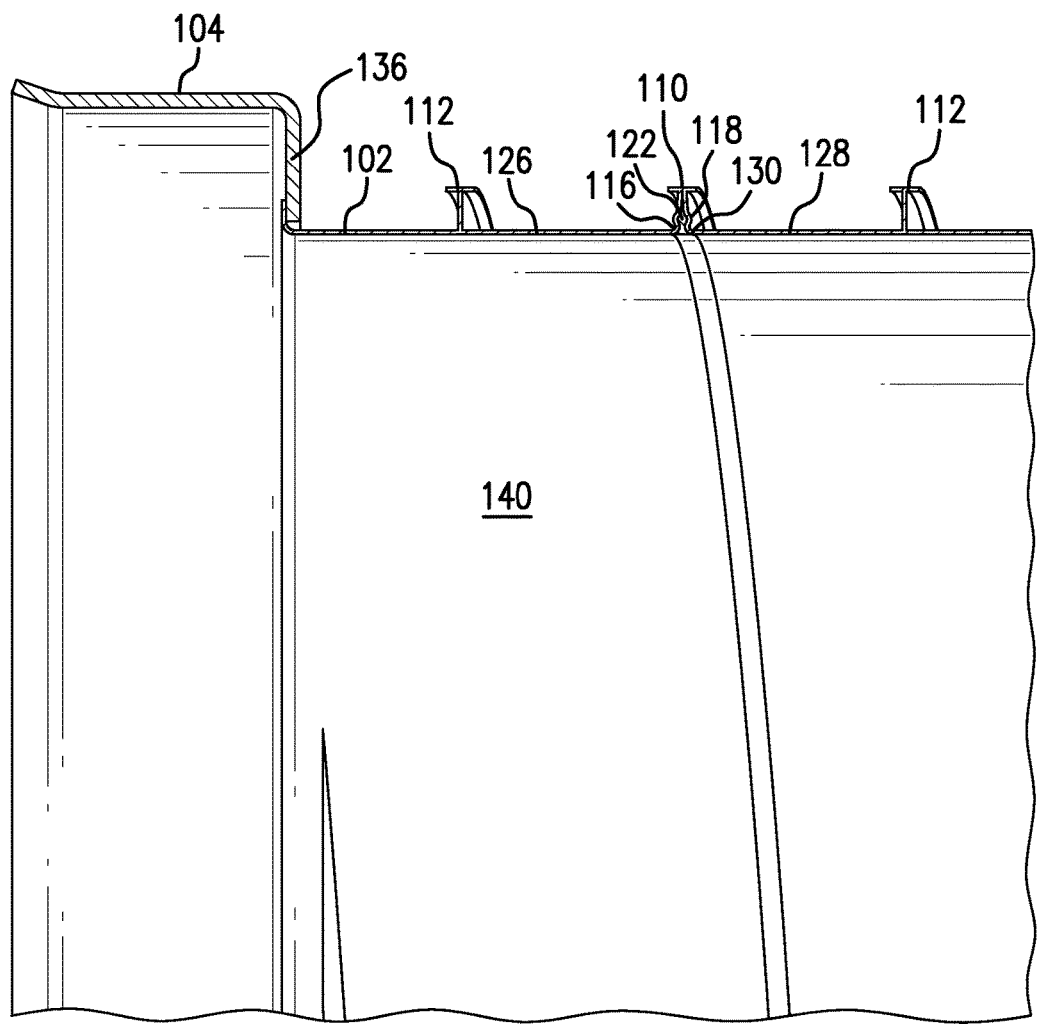
FIG. 7 shows a close up view of area 7 of FIG. 6.

FIG. 7 shows liner 102 combined to female end cap 104. Liner 102 can be welded to a ring 136 of each female end cap 104 and male end cap 107 to create a pipe that when installed has no concrete surface exposed to the transport area. This simplifies the installation process where liner 102 may have to be welded to the respective female end cap 104 and male end cap 107 after installation.

Before liner 102 is casted with concrete shell 109, space 122 between first side 116 and second side 118 of joint 114 of rib formation 110 can be welded and filled with weld material to add rigidity to joint 114 but leave enough flexibility for joint 114 to function.

Figure 8:
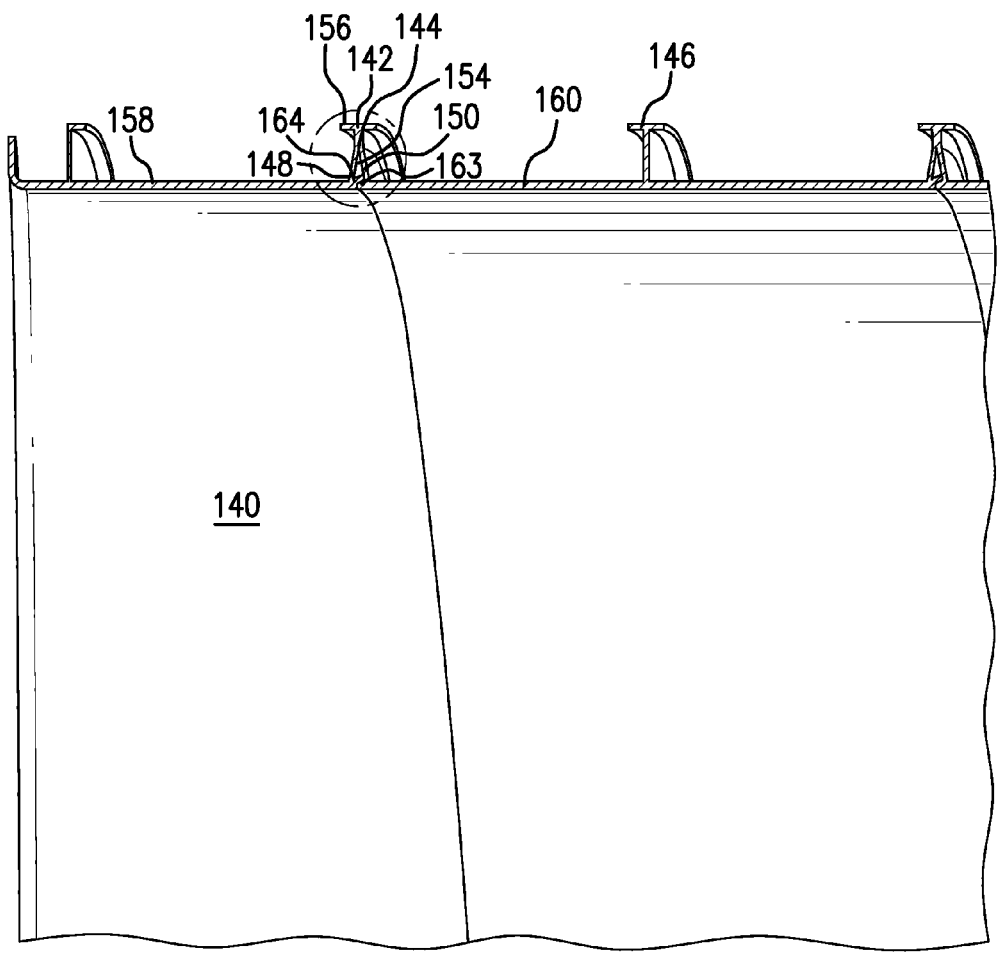
FIG. 8 shows another implementation of a joint in a concrete liner.
Figure 8A:
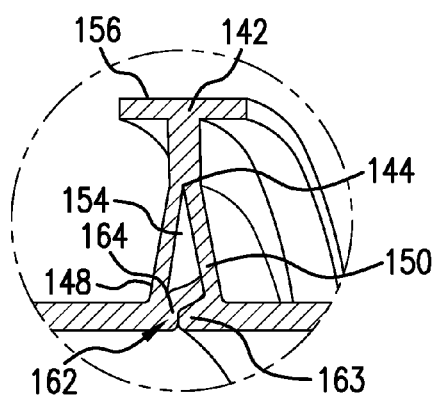
FIG. 8A shows a close-up view of the circled area in FIG. 8.

FIG. 8 shows another implementation for a liner 140. Liner 140 has two types of alternating rib formations to mechanically lock liner 140 to concrete shell 109, a rib formation 142 with a joint 144 and a rigid rib formation 146 without a joint. Rib formation 142, which includes joint 144, has a first side 148 and a second side 150 joined together at the top. In practice, joint 144 can be formed by a cut up the center of rib formation 142 with the terminus of the split being the point of flexion; however, any mechanism to combine first side 148 with second side 150 is contemplated. A space 154 is formed between first side 148 and second side 150, which provides space for first side 148 and second side 150 to move with respect to each other as liner 140 expands and contracts.

Joint 144 of rib formation 142 is formed with a labyrinth seal 162 formed by a male protuberance 163 at the junction of second side 150 and second shell 160 and a female indention 164 at the junction of first side 148 and first shell 158. Labyrinth seal 162 keeps contents from the transport area out of space 154, but allows first side 148 and second side 150 to move relative to each other so liner 140 can expand and contract.

Rib formation 142 has a transverse section 156 that extends generally perpendicular to first side 148 and second side 150. Transverse section 156 mechanically locks liner 140 to concrete shell 109.

Figure 9:
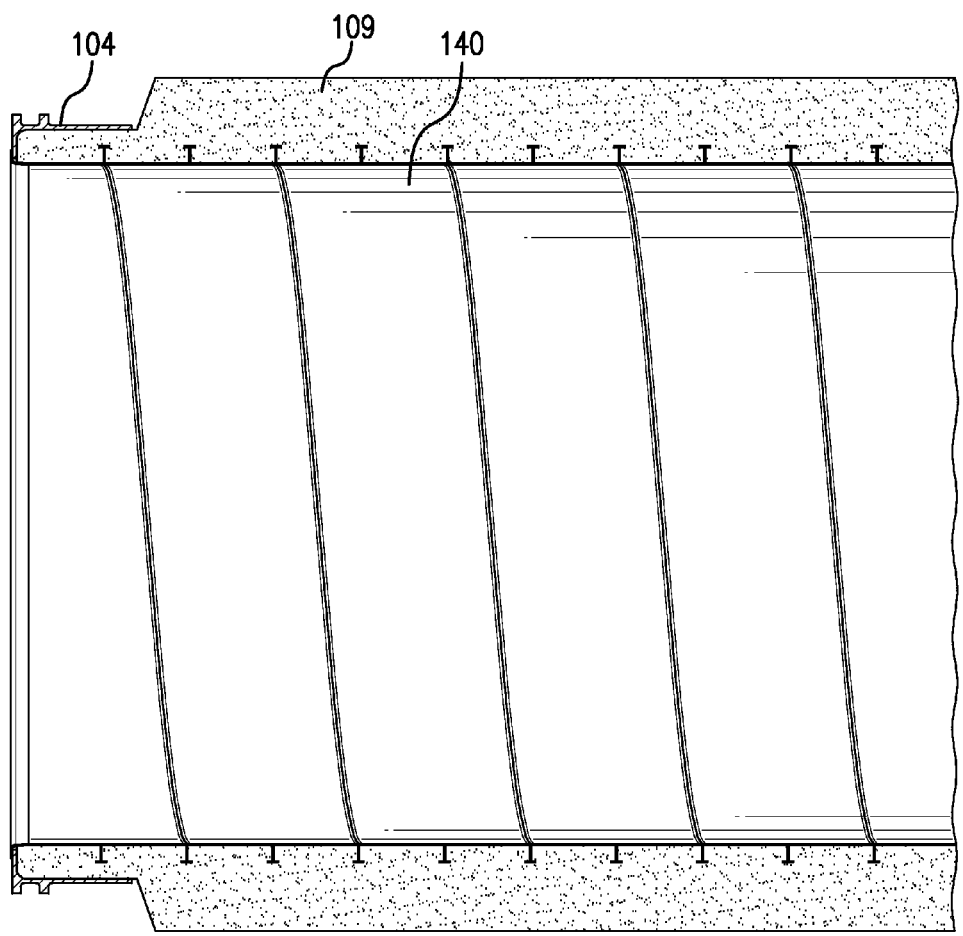
FIG. 9 shows a concrete pipe with the liner of FIG. 8.
Figure 10:
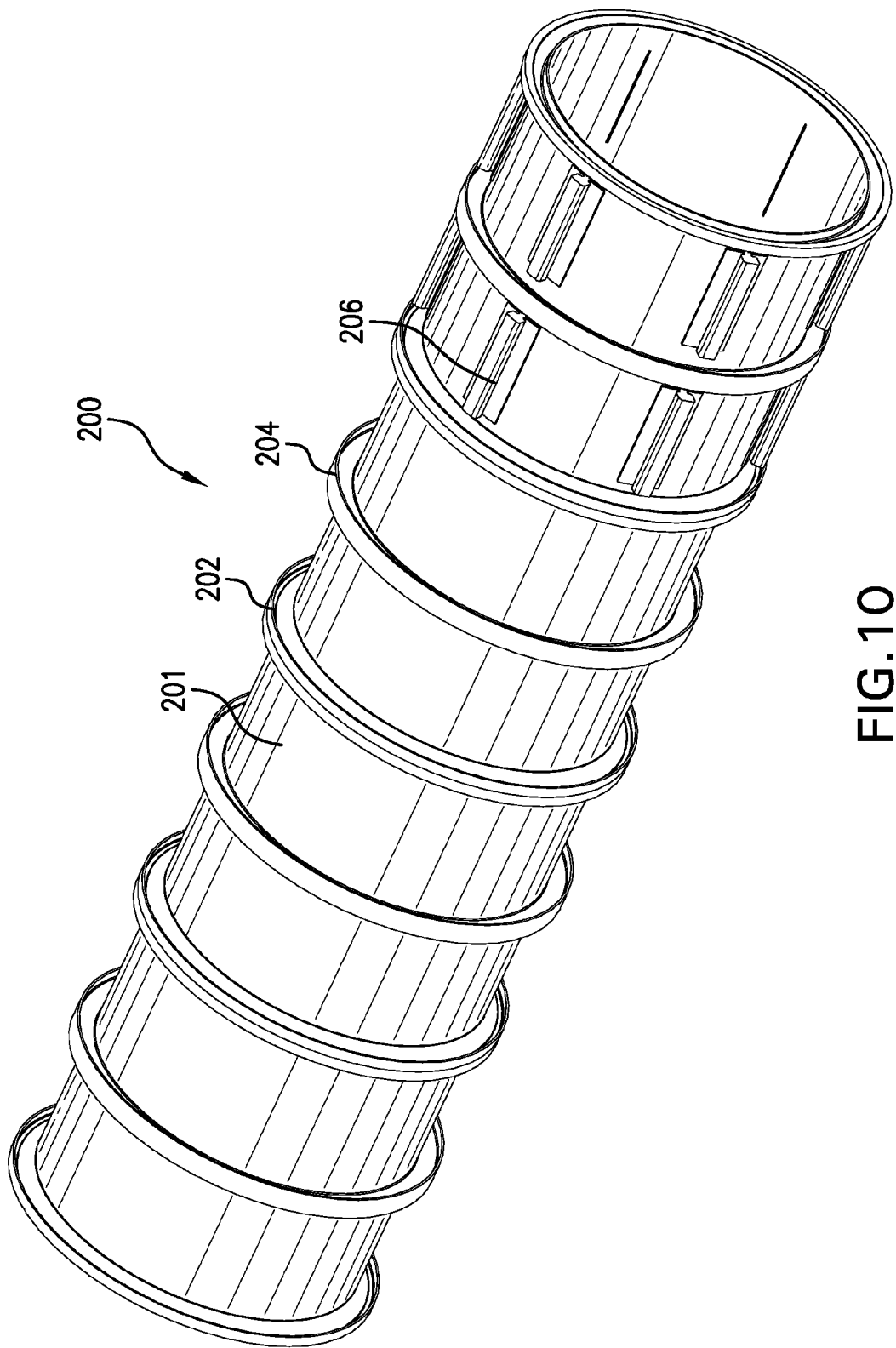
FIG. 10 shows a concrete pipe liner with a combination of joints to allow the liner to expand radially and axially.

First side 148 and second side 150 of rib formation 142 can each be combined with a first shell 158 and a second shell 160, respectively, and can be integral with each. Rib formation 142 and both or one of first shell 158 and second shell 160 can be spirally wound and welded together to form liner 140. In another implementation, rigid rib formation 146 can be combined to one of or both of first shell 158 and second shell 160. FIG. 9 shows liner 140 combined to female end cap 104 with concrete shell 109 cast around liner 140.

The foregoing structure of liners 102 and 140 combined to female end cap 104 and male end cap 107 creates in an inner transport area that is resilient to corrosion and leakage. Liners 102 and 140 can be made of any low permeable material, such as steel or polymers. Similarly, female end cap 104, a male end cap 107 can also be made of any low permeable material, such as steel or polymers. When these are combined together they form a transport area that completely shields concrete shell 109 from the contents and gasses in the transport area with a liner that can expand and contract with temperature and pressure variations.

FIGS. 10-13 shows a liner 200 for a concrete pipe with a radial and axial expansion joint. Liner 200 can be made of a polymer, which tends to expand much more than concrete. The radial and axial rib formations with joints discussed below allow for thermal expansion of liner 200. In some applications, an external axial force acts to pull or stretch the pipes. Liner 200 can stretch with such axial force without cracking.

Figure 11:
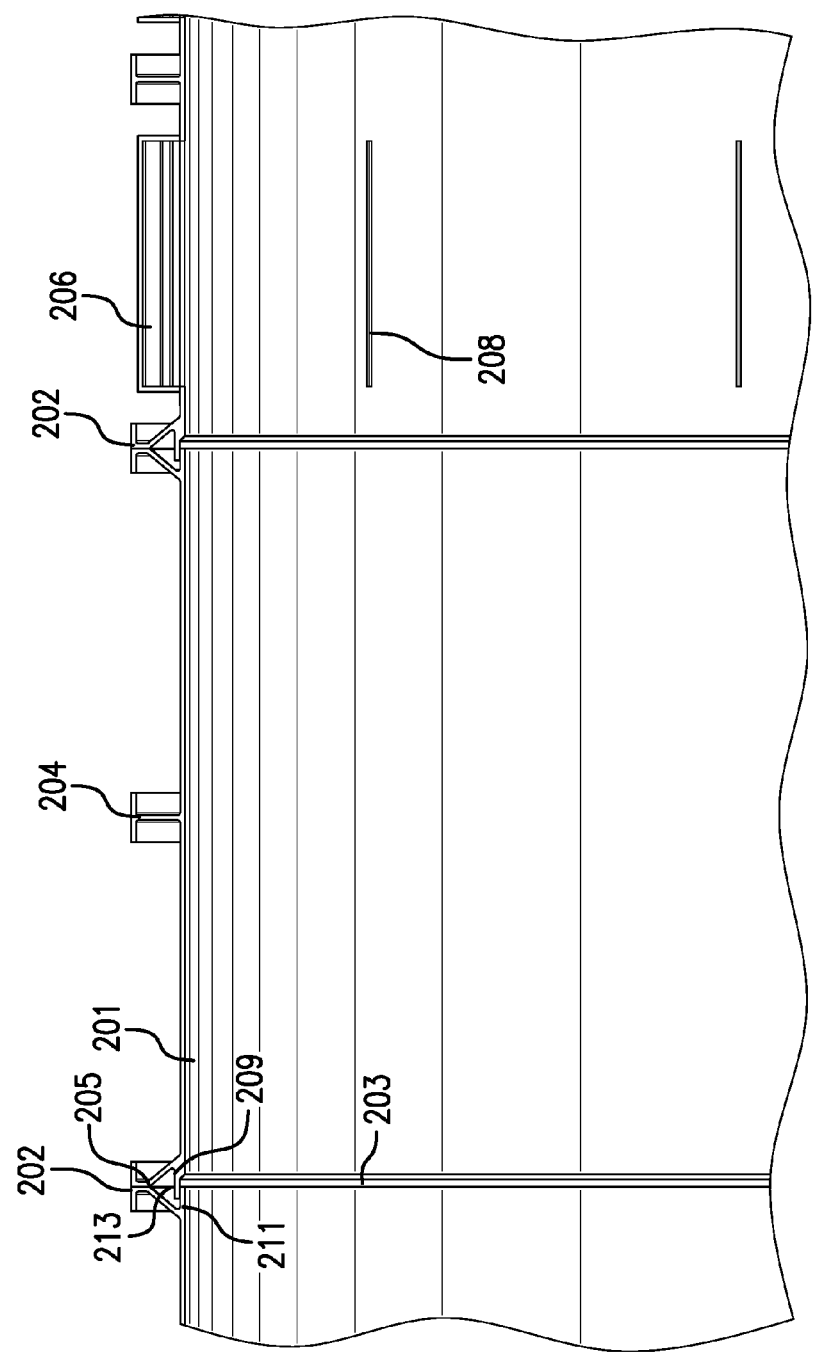
FIG. 11 shows a cross-section of the liner of FIG. 10.
Figure 12:
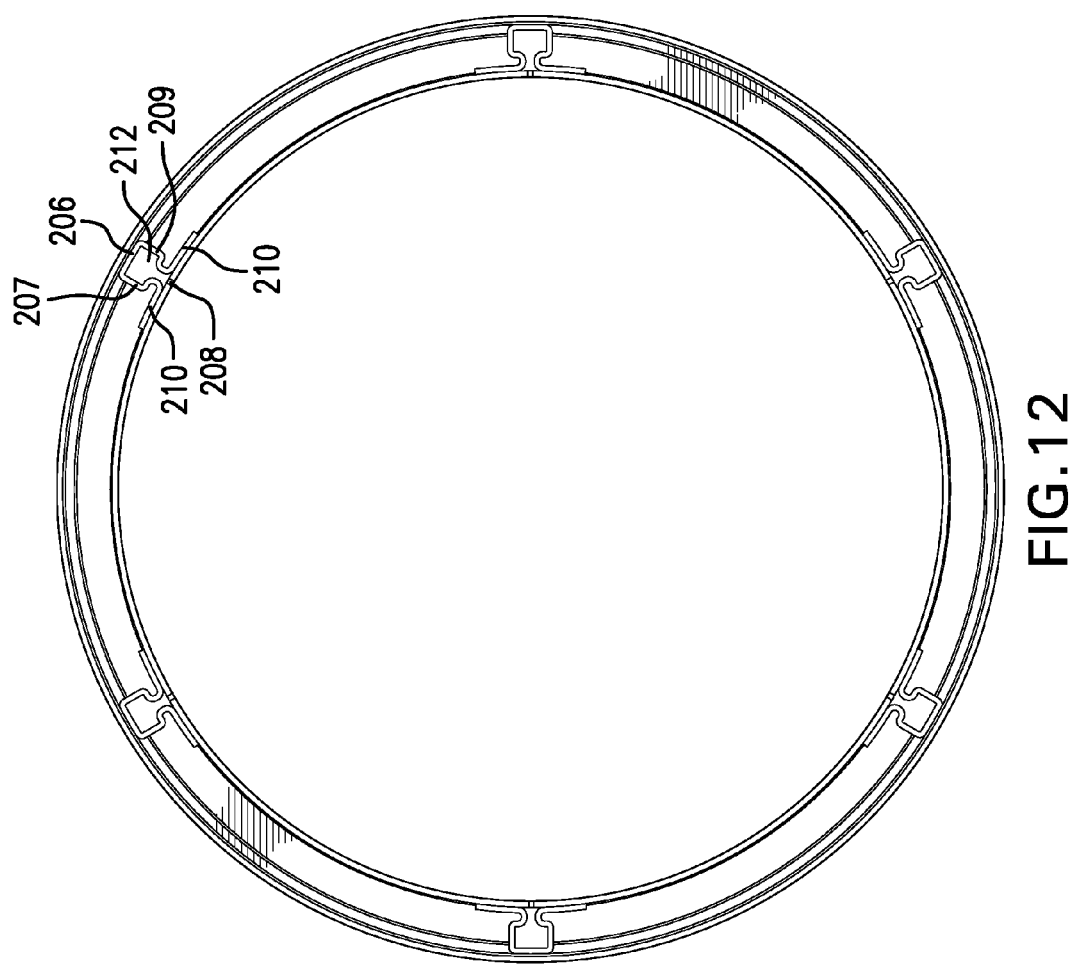
FIG. 12 shows a front view of the liner of FIG. 11.
Figure 13:
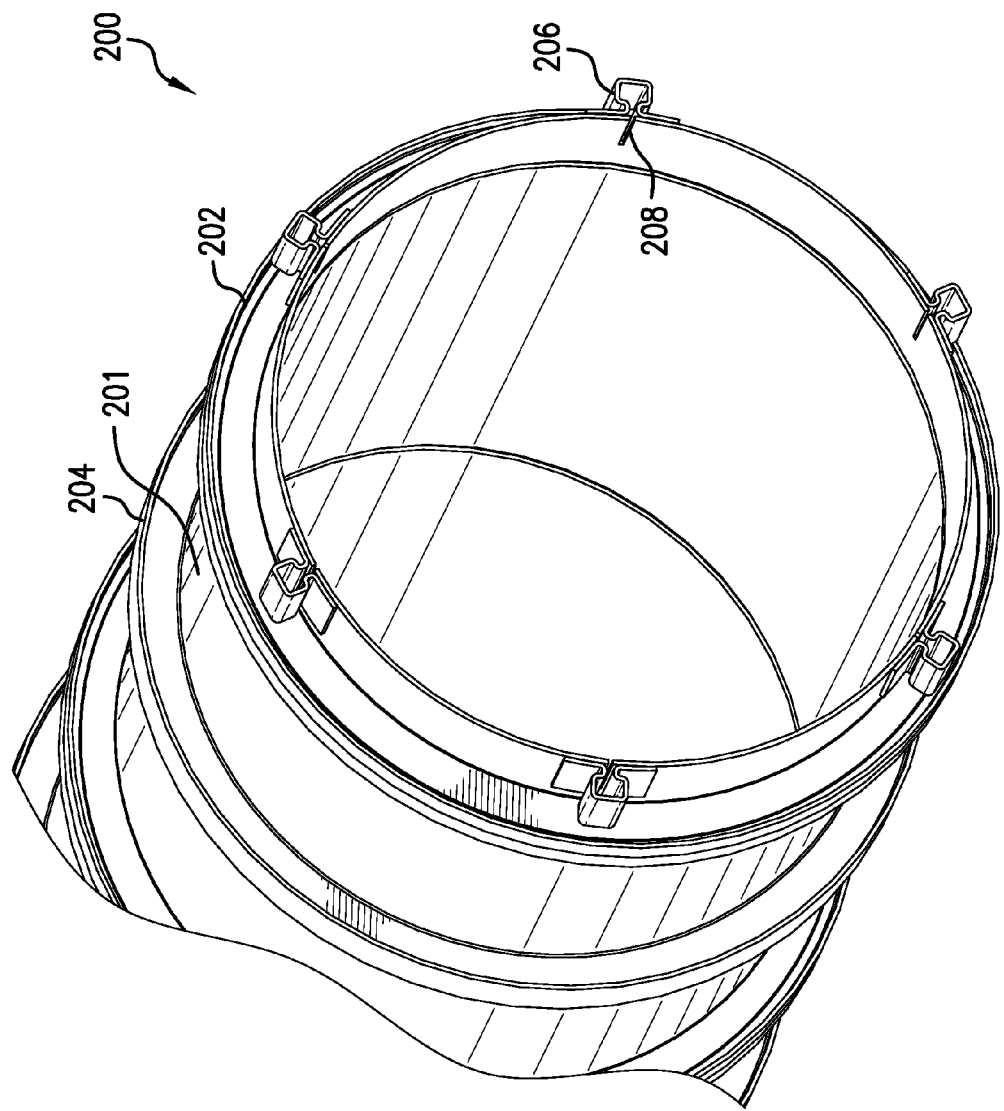
FIG. 13 shows a front-facing perspective view of the liner of FIG. 10.

Liner 200, as shown in in FIG. 11, includes a shell 201 made from a sheet material that is spirally welded from the inside to form a cylindrical shape to create a first axial expansion joint 203 at the weldments. The weld material is a substance with elasticity greater than the elasticity of shell 201. On the outside of shell 201 a rib formation 202 is welded.

Rib formation 202 has a first latitudinal section 209 that overlaps a second latitudinal section 211 radially beneath an area 213. Each first latitudinal section 209 and second latitudinal section 211 are combined together at a radial/axial expansion joint 205. Radial/axial expansion joint 205 allows first latitudinal section 209 and second latitudinal section 211 to axially retract or expand with respect to each other or for first latitudinal section to radially expand away from second latitudinal section. A rigid rib formation 204 can be formed with or welded to the outside of shell 201 to provide strength and rigidity.

Another rib formation 206 is welded over a radial relief 208 that is cut axially into liner shell 201. Rib formation 206 has a first side 207 and a second side 209 joined together to form a radial expansion joint. At the other end of rib formation 206 at each one of first side 207 and second side 209 is a plate 210 that can be welded to shell 201 on opposite sides of radial relief 208 to hold shell 201 together. A space 212 is formed inside rib formation 206 between first side 207 and second side 209 to provide the needed area for rib formation 206 to expand radially with shell 201.

Liner 200 can be constructed with any sequence of rib formation 202, rigid rib formation 204, and rib formation 206 or without one or more of the same. Liner 200 can be constructed with a spigot and bell, which allows liner 200 to be installed in the field without any other coupler, which makes liner 200 more resistant to external pressures.

Reference has been made throughout this disclosure to "one embodiment," "an embodiment," or "embodiments" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

While the present invention has been particularly shown and described with reference to exemplary embodiments thereof, it should be understood by those of ordinary skill in the art that various changes, substitutions and alterations could be made herein without departing from the spirit and scope of the invention as embodied by the appended claims and their equivalents.

What is claimed is:

1. A liner for a concrete pipe comprising:
   a rib formation with a transverse section configured to mechanically lock the liner to the concrete pipe; and a joint with a first side and a first latitudinal section combined to the first side, and a second side and a second latitudinal section combined with the second side, wherein the first latitudinal section and the second latitudinal section are axially moveable with respect to each other to allow the first side to move with respect to the second side to allow for expansion and contraction of the liner.

2. The liner of claim 1, and further comprising a first shell combined to the first side of the joint.

3. The liner of claim 2, wherein the first shell is integral with the first side of the joint.

4. A concrete article comprising:
a liner having a first end and a second end and a rib formation with a joint to allow the rib formation to flex, wherein the rib formation further comprises a transverse section to mechanically lock the rib formation of the liner to a concrete shell, and wherein the joint further comprises a first side combined at one end to the transverse section and a second side combined at one end to the transverse section, and wherein the first side and the second side move with respect to each other, wherein the joint further comprises a space between the first side and the second side filled with a weld material;
a female end cap attached to the first end of the liner;
a male end cap attached to the second end of the liner; and
the concrete shell extending from the female end cap to the male end cap and covering the liner and mechanically locked to the liner.

5. The liner of claim 4, wherein the rib formation and a first shell combined to the joint are spirally wound to create the liner.

6. The liner of claim 5, wherein the first side of the joint further comprises a female end and the second side of the joint further comprises a male end, wherein the female end fits together with the male end to create a labyrinth seal.

7. The liner of claim 4, and further comprising a first shell combined with the first side of the joint and a second shell combined with the second side of the joint and a rigid rib formation combined to one of the first shell and the second shell, wherein the rib formation, the first shell, the second shell, and the rigid rib formation are spirally wound to form the liner.

8. The liner of claim 1, and further comprising a male end cap and a female end cap combined at opposite ends of the liner and a concrete shell casted around the liner forming a lined concrete pipe with a transport area separate from the concrete shell.

9. The liner of claim 1, and further comprising a male end cap and a female end cap combined at opposite ends of the liner, wherein the liner is welded to the male end cap and the female end cap before casting a concrete shell around the liner.

10. The liner of claim 1, wherein the first side and the second side are parallel with an axis of the liner, and the transverse section is parallel with the axis of the liner to enable the liner to radially expand.

11. The concrete article of claim 4, wherein the first side of the joint further comprises a female end and the second side of the joint further comprises a male end, wherein the female end fits together with the male end to create a labyrinth seal.

12. A concrete article comprising:
a liner having a first end and a second end and a rib formation with a joint to allow the rib formation to flex, wherein the joint comprises of a first side and a first latitudinal section combined to the first side, and a second side and a second latitudinal section combined with the second side, wherein the first latitudinal section and the second latitudinal section are axially moveable with respect to each other to allow the first side to move with respect to the second side to allow for expansion and contraction of the liner;
a female end cap attached to the first end of the liner;
a male end cap attached to the second end of the liner; and
a concrete shell extending from the female end cap to the male end cap and covering the liner and mechanically locked to the liner.

13. The liner of claim 12, and further comprising a first shell combined to the first side of the joint.

14. The liner of claim 13, wherein the first shell is integral with the first side of the joint.

15. The concrete article of claim 4, and further comprising a first shell combined to the first side of the joint, wherein the first shell is integral with the first side of the joint, and wherein the rib formation and the first shell are spirally wound to create the liner.

* * * * *